US012729310B2

(12) United States Patent
Lancaster et al.

(10) Patent No.: US 12,729,310 B2
(45) Date of Patent: Sep. 8, 2026

(54) LUMINESCENT COLD SPRAY COATING AND METHOD

(71) Applicant: United States of America, as represented by the Secretary of the Navy, Patuxent River, MD (US)

(72) Inventors: Frederick Lancaster, Dameron, MD (US); Jason Shaw, California, MD (US); Troy Townsend, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 797 days.

(21) Appl. No.: 18/072,949

(22) Filed: Dec. 1, 2022

(65) Prior Publication Data

US 2024/0182723 A1 Jun. 6, 2024

(51) Int. Cl.

| | |
|---|---|
| ***C05D 1/00*** | (2006.01) |
| ***C09D 5/03*** | (2006.01) |
| ***C09D 5/22*** | (2006.01) |
| *C09D 1/00* | (2006.01) |

(52) U.S. Cl.
CPC ............... *C09D 5/22* (2013.01); *C09D 5/031* (2013.01); *C09D 5/033* (2013.01); *C09D 1/00* (2013.01)

(58) Field of Classification Search
CPC .......... C09D 5/22; C09D 5/031; C09D 5/033; C09D 1/00
See application file for complete search history.

(56) References Cited

U.S. PATENT DOCUMENTS

2009/0084981 A1* 4/2009 Bown ................ G01N 21/8806 235/375
2023/0313384 A1* 10/2023 Bruton .................... B32B 15/20 428/413

FOREIGN PATENT DOCUMENTS

| | | | | | |
|---|---|---|---|---|---|
| EP | 3943573 | A1 * | 1/2022 | | C09K 11/02 |
| JP | 2022071737 | A * | 5/2022 | | |
| TW | 200813464 | A * | 3/2008 | | |
| WO | WO-2005079209 | A2 * | 9/2005 | | C23C 24/04 |
| WO | WO-2011101001 | A1 * | 8/2011 | | B22D 23/003 |
| WO | WO-2013092499 | A1 * | 6/2013 | | F21V 7/30 |

OTHER PUBLICATIONS

Machine English translation of Giraud Damien, EP-3943573-A1, Jan. 26, 2022. (Year: 2022).*
Machine English translation of Baur Elmar, WO-2013092499-A1, Jun. 27, 2013. (Year: 2013).*

(Continued)

*Primary Examiner* — Pamela H Weiss
*Assistant Examiner* — Caroline D. Liott
(74) *Attorney, Agent, or Firm* — Mark O. Glut; NAWCAD

(57) ABSTRACT

A luminescent cold spray coating and precursor feed powder comprising of a metallic matrix, non-metallic composite particles dispersed within the metallic matrix at about 0-60% by volume, and, luminescent material disposed within the matrix. A method for preparing luminescent metal coating, the method comprising the steps of accelerating metal powder, a luminescent material, and a carrier gas through a convergent-divergent Laval nozzle at a speed in the range of about 300 to 1200 m/s onto a work product.

2 Claims, 2 Drawing Sheets

(56) References Cited

OTHER PUBLICATIONS

Figure 1:
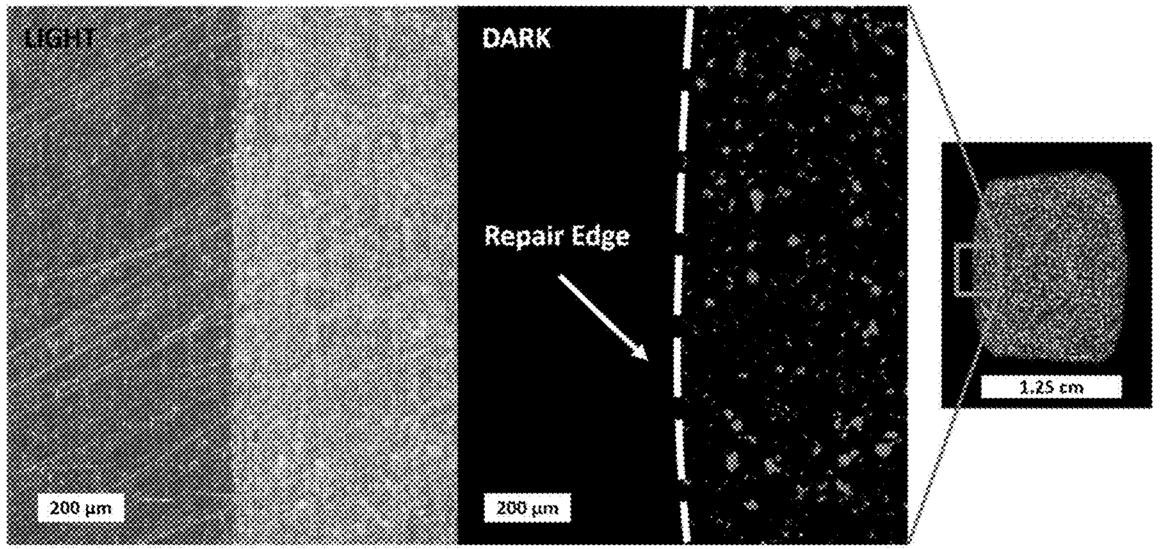

Machine English translation of Yamada Motohiro, JP-2022071737-A, May 16, 2022. (Year: 2022).*
Delgado et al, "Characterization and afterglow of SrAl2O4:Eu,Dy for various phosphor applications," 2020, Proc. of SPIE vol. 11357, pp. 113571C-1 to 113571C-7. (Year: 2020).*
Machine English translation of Bown Mark, TW-200813464-A, Mar. 16, 2008. (Year: 2008).*

* cited by examiner

LUMINESCENT COLD SPRAY COATING AND METHOD

STATEMENT OF GOVERNMENT INTEREST

The invention described herein may be manufactured and used by or for the Government of the United States of America for governmental purposes without payment of any royalties thereon or therefor.

BACKGROUND

Cold gas dynamic spray or simply cold spray (CS), also known as supersonic particle deposition (SPD) and kinetic metallization (KM), is a deposition technique where dry metal powders are accelerated through a Laval nozzle at high enough velocities and heat such that the metal powders partially melt on impact. This process was used to build up a coating of solid metal in the repair of machine parts on vehicles including military aircraft. CS/SPD/KM has the tremendous advantage of on-site repair of complicated solid metal parts, saving time and energy for repairing parts rather than replacing a new manufactured metal item. Metal surfaces can be damaged by corrosion, wear, or cracking due to a variety of stresses depending on the application and the type of metal or metal matrix composite material. The damaged area is typically cleaned and then filled in with CS/SPD/KM deposited metal followed by polishing to refurbish the part before returning to service.

The finished product with the CS/SPD/KM repair appears to be identical to the original metal via visual inspection. However, the CS/SPD/KM filling may have different properties (corrosion resistance, fatigue, wear rate, abrasion, adhesion, etc.) than the original metal. Because of this, it is important to aircraft maintenance officers to identify the CS/SPD/KM repair location, area and depth. For example, a CS/SPD/KM repaired part may return for additional repairs several years after the original repair. Without identifying the location of the original CS/SPD/KM repair, it is not possible to determine if the CS/SPD/KM area was the cause of the damage. Current non-contact inspections use invisible pin-point or scanning specialized equipment (for example, but without limitation, eddy current testing or ultrasound inspection) to trace the location of the repair. In contrast, an area repaired with luminescent cold spray coating is quickly located by visual inspection, without any testing or specialized equipment.

During a cold spray (CS/SPD/KM) deposition, metal powder is accelerated through a convergent-divergent Laval nozzle at high speeds (300-1200 m $s^{-1}$) along with a carrier gas. At lower pressures (300-600 m $s^{-1}$), known as Low Pressure CS (LPCS/SPD/KM), generally softer metals like aluminum, zinc, copper, cobalt, and nickel are able to be deposited and reach critical velocity (speed to melt on impact). In contrast, harder metals and ceramics CS/SPD/KM require high pressure (HPCS/SPD/KM, >600 m $s^{-1}$).

Metal machine parts often have narrow dimension tolerances for use. After use, the outer layer is often worn down due to friction to a thickness that is not acceptable or optimal. Currently the magnitude of this tribological wear is difficult and usually impossible to identify visually. A layered material containing luminescent materials would make wear inspection faster and simpler. Each layer that becomes visible from wear would indicate a new level of acceptable or unacceptable wear depending on the thickness of each layer, significantly minimizing time.

Furthermore, lost tools lead directly to wasted time and energy, which comes at great cost to military and civilian companies. Additionally, a missing tool not found on an aircraft greatly increases the chance of that aircraft suffering a catastrophic mishap and potential loss of life.

Based on a survey entitled "Finding Dropped Tools in Aviation Maintenance," it was determined that across a population of 221 aircraft maintenance technicians, an estimated 2,050 work-hours over a particular year was spent searching for dropped/missing hand tools onboard aircraft. One can estimate that on average, each aircraft technician spends 9.27 work-hours a year searching for lost hand tools. This scales to over 200,000 work hours per year across the United States Navy fleet and considering hourly pay scales, equates to a loss of over $8 million (2022 dollars) per year for the U.S. Navy alone. Currently, U.S. Navy maintainers locate missing hand tools on the flight line visually using a flashlight in dark environments. Metal hand tools containing a luminescent cold spray coating would increase the visibility and reduce work-hours spent searching for missing tools.

SUMMARY

The present invention is directed to with the needs enumerated above and below.

The present invention is directed to a luminescent cold spray coating comprising of a metallic matrix, non-metallic composite particles dispersed within the metallic matrix at 0-60% by volume, and luminescent material disposed within the matrix. The present invention is further directed to a method for preparing luminescent metal coating, the method comprising the steps of accelerating metal powder, luminescent material, and a carrier gas through a convergent-divergent Laval nozzle at a speed in the range of 300 to 1200 m/s onto a work product.

It is a feature of the present invention to provide a luminescent cold spray coating and method for preparing luminescent cold spray coatings, particularly for application on cold spray repairs, so that the repair location or cold spray deposition itself can be easily found by visual inspection.

It is a feature of the present invention to provide a luminescent cold spray coating and method for preparing luminescent cold spray coatings that contains luminescent material that emits light via fluorescence and/or phosphorescence upon excitation from visible and/or ultraviolet light, or through mechanoluminescence.

It is a feature of the present invention to provide a luminescent cold spray coating and method that is low cost and effective, without compromising the integrity of typical cold spray coating properties.

It is a feature of the present invention to provide a luminescent cold spray coating and method that when deposited in sequential layers, each layer may be identified uniquely to aid in tribological wear identification.

It is a feature of the present invention to provide a luminescent cold spray coating that is visible to the unaided eye in scotopic conditions where dark adaptation is required, or in low light photopic conditions, after activation from a light source, for example, when locating missing items.

It is a feature of the present invention to provide a luminescent cold spray feed powder recipe that is used as a precursor for luminescent cold spray coatings.

DRAWINGS

Figure 2:
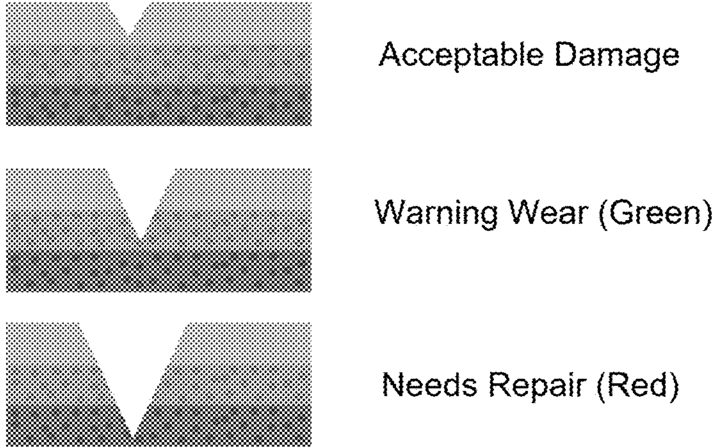

These and other features, aspects and advantages of the present invention will become better understood with reference to the following description and appended claims, and accompanying drawings wherein:

FIG. 1 is a depiction of a luminescent cold spray repair on aluminum substrate where cold spray powder was deposited with 30% by volume luminescent material (repair edge is located by visual inspection by eye and with an optical microscope in light and dark conditions); and, FIG. 2 is a cross-section example for tribological wear identification application with layered luminescent cold spray composites disposed with different luminescent material that are visually unique with identifiable colors to indicate degree of wear by visual inspection.

DESCRIPTION

The preferred embodiments of the present invention are illustrated by way of example below and in FIGS. 1-2. The luminescent cold spray coating includes a metallic matrix, non-metallic composite particles dispersed within the metallic matrix at about 0-60% by volume, and luminescent material disposed within the matrix. Moreover, a luminescent cold spray feed powder includes a metal powder, non-metallic composite particles dispersed within the metal powder at 0-60% by volume, and luminescent material disposed within the powder.

The metallic matrix may be aluminum metal; however, other metals could be used, such as, but without limitation, copper, zinc, steel, titanium, tungsten, cobalt, carbide, indium, gallium, nickel, or any type of metals, metal alloys, or materials practicable.

Non-metallic composite particles may be added at desired loadings (for example, but without limitation, $Al_2O_3$, SiC, $B_4C$, TiN, or Carbon Nanotubes, or be encapsulated with a ceramic or polymer shell) to enhance coating properties or end function of the as cold sprayed material.

In the preferred embodiment, the luminescent material particle sizes may be about 50-85 μm; however, these particle sizes could be as low as about 5 μm and as high as about 200 μm. The luminescent material is preferably dispersed within the aluminum matrix at about 10-30% by volume. This could be about 1-50% loading by volume for functional applications and/or up to about 80% loading by volume for decorative applications. As shown in FIG. 1, the interface between the original substrate material (workpiece) and the deposited luminescent cold spray material is observable by visual inspection or with an optical microscope. In contrast, the locations of traditional non-luminescent cold spray repairs are not visible and require pin-point location detection equipment to trace the repair.

The luminescent material may be any type of luminescent material; however, fluorescent and/or phosphorescent materials are preferred. The preferred embodiment utilizes a long persistent green phosphor, $SrAl_2O_4{:}Eu^{2+}Dy^{3+}$, or a long persistent blue phosphor, $SrAl_{12}O_{19}{:}Eu^{2+}Dy^{3+}$.

The luminescent material could be replaced by another phosphor, either organic or inorganic. Examples of organic material that may utilized can include, but without limitation, Rhodamine 6G, Rhodamine B, or polymer. Examples of inorganic material that may be utilized include, but without limitation, $SrAl_2O_4{:}Eu^{2+}Dy^{3+}$, $SrCaAl_2O_4{:}Eu^{2+}Dy^{3+}$, $SrBaAl_2O_4{:}Eu^{2+}Dy^{3+}$, $Y_2O_3{:}Eu^{3+}$, or $BaMg_2Al_{16}O_{27}{:}Eu^{2+}$.

The luminescent material may be of a mixed variety that also contain the colors at varied loadings (green, blue, red, yellow, etc.) and various particle sizes to provide a decorative or desired functional effect. For example, as shown in FIG. 2, materials that luminesce with different colors can be deposited in sequence layer by layer to visually quantify the degree of tribological wear in metal parts.

The method for creating the luminescent metal coating includes accelerating a metal powder, a luminescent material (preferably a phosphor material), and a carrier gas through a convergent-divergent Laval nozzle at a speed in the range of about 300 to 1200 m/s onto a work product, particularly a tool, an aircraft part, or the aircraft. The luminescent metal coating can be created and deposited, but without limitation, by Cold Spray metallization, also known as supersonic particle deposition (SPD) and kinetic metallization (KM). The process can use a Low-Pressure Cold Spray (LPCS) with a powder speed of about 300-600 m/s or a High-Pressure Cold Spray (HPCS) with a speed of about 300-1200 m/s. The feed powder (metal powder) may contain Aluminum powder with about 5-45 μm particle diameters or other metal powders could be used. The feed powder can also contain a luminescent material, such as, but without limitation, $SrAl_2O_4{:}Eu^{2+}Dy^{3+}$. The feed powder can also contain a non-metallic composite particle, such as, but without limitation, $Al_2O_3$.

In the preferred method, the loading of the luminescent material is about 10-30% by volume with about 70-90% by volume Aluminum. Additionally, the luminescent material loading can be adjusted (about 1-50% for functional coatings or greater than about 50% for decorative coatings) to control the hardness, durability and brightness of CS coating. The preferred gas flow rate is about 30-100 CFM or greater, while the preferred powder feed rate is about 1-30 lbs/h or greater.

In the preferred embodiment, the luminescent material particle size, the non-metallic composite particle size, and the metal matrix particles sizes range from about 5-75 μm and could originate from a mixture of dried powder or a solid composite of cast material with the particles pre-mixed in, then physically made into a particle that can be sprayed. The preferred carrier gas is air, He, $N_2$, or a combination of these particular gasses. However, any type of gas practicable can be utilized. The preferred carrier gas temperature is about 0 degrees Celsius to about 1600 degrees Celsius or greater.

In one of the preferred embodiments, during the course of the method of producing the luminescent metal coating, feedstock powder is propelled from a supersonic nozzle and particles impact a substrate at a few inches away to form a metallurgical bond. The particles plastically deform to produce a dense low porosity coating. Material may be applied by a technician manually or robotically via a predetermined pattern. Material can also be deposited by any additive process from a feedstock of powder or solid material. The additive process utilized, may be, but without limitation, 3D printing, powder blown additive, or additive friction stir welding to build a 3-dimensional object.

In the description of the present invention, the invention will be discussed in a military environment; however, this invention can be utilized for any type of application that requires use of a cold spray system, tribological wear identification or locating items in dim lighting conditions.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible.

Therefore, the spirit and scope of the appended claims should not be limited to the description of the preferred embodiment(s) contained herein.

What is claimed is:

1. A luminescent cold spray coating comprising:

a metallic matrix comprising a metal powder, wherein the metal powder is chosen from the group consisting of copper, zinc, steel, titanium, tungsten, cobalt, carbide, indium, gallium, and nickel;

non-metallic composite particles dispersed within the metallic matrix at 0-60% by volume; and, luminescent material disposed within the metallic matrix at 1-50% by volume, the luminescent material is chosen from the group consisting of $SrAl_2O_4:Eu^{2+}Dy^{3+}$, $SrAl_{12}O_{19}:Eu^{2+}Dy^{3+}$, $SrCaAl_2O_4:Eu^{2+}Dy^{3+}$, $SrBaAl_2O_4:Eu^{2+}Dy^{3+}$, $Y_2O_3:Eu^{3+}$, and $BaMg_2Al_{16}O_{27}:Eu^{2+}$, wherein the luminescent material has a diameter of 5-200 μm, wherein the metal powder has a diameter of 5-75 μm, wherein further the luminescent cold spray coating is visible to the unaided eye.

2. A luminescent cold spray feed powder comprising:

a metal powder chosen from the group consisting of copper, zinc, steel, titanium, tungsten, cobalt, carbide, indium, gallium, and nickel;

non-metallic composite particles dispersed within the metal powder at 0-60% by volume; and, luminescent material disposed within the metal powder at 1-50% by volume;

wherein the luminescent material has a diameter of 5-200 μm, wherein the metal powder has a diameter of 5-75 μm, the luminescent material is chosen from the group consisting of $SrAl_2O_4:Eu^{2+}Dy^{3+}$, $SrAl_{12}O_{19}:Eu^{2+}Dy^{3+}$, $SrCaAl_2O_4:Eu^{2+}Dy^{3+}$, $SrBaAl_2O_4:Eu^{2+}Dy^{3+}$, $Y_2O_3:Eu^{3+}$, and $BaMg_2Al_{16}O_{27}:Eu^{2+}$.

* * * * *